United States Patent [19]
Ghirga et al.

[11] 3,875,204
[45] Apr. 1, 1975

[54] PROCESS FOR THE PRODUCTION OF ACRYLONITRILE

[75] Inventors: Marcello Ghirga, Bresso; Gian Fausto Buzzi, Arona, both of Italy

[73] Assignee: Societa' Italiana Resine S.I.R. S.p.A., Milan, Italy

[22] Filed: July 18, 1973

[21] Appl. No.: 380,525

[30] Foreign Application Priority Data
Aug. 1, 1972  Italy .................................. 27740/72

[52] U.S. Cl. ............... 260/465.3, 252/437, 252/456
[51] Int. Cl. ............................................ C07c 121/02
[58] Field of Search .................................. 260/465.3

[56] References Cited
UNITED STATES PATENTS

| | | |
|---|---|---|
| 3,226,422 | 12/1965 | Sennewald et al. ............... 260/465.3 |
| 3,321,507 | 5/1967 | Ginnasi et al. .................... 260/465.3 |
| 3,342,849 | 9/1967 | Brill et al. ......................... 260/465.3 |
| 3,347,899 | 10/1967 | Caporali et al. ................... 260/465.3 |
| 3,642,930 | 2/1972 | Grasselli et al. ............. 260/465.3 X |
| 3,766,092 | 10/1973 | Honda et al. ................. 260/465.3 X |

Primary Examiner—Joseph P. Brust
Attorney, Agent, or Firm—Sughrue, Rothwell, Mion, Zinn & Macpeak

[57] ABSTRACT

Novel metal oxide catalyst having the empirical chemical formula $$Bi_{4-9} Zr_{1-4} Fe_{0.5-2} Mo_{12} V_{0.01-1} P_{0-2} O_{45-68}$$

for the production of acrylonitrile by reaction of propylene with ammonia and oxygen or gases containing free oxygen.

6 Claims, No Drawings

PROCESS FOR THE PRODUCTION OF ACRYLONITRILE

The invention relates to a process for the production of acrylonitrile by reaction of propylene with ammonia and oxygen or gases containing free oxygen in the presence of novel metal oxide catalysts containing iron, bismuth, molybdenum, and possibly phosphorus.

Acrylonitrile is a valuable intermediate, particularly for the production of rubbery and fibre-forming polymers.

Various processes are known for the production of acrylonitrile from propylene. In one known process, propylene is first allowed to react with oxygen or gases containing free oxygen in the presence of a metal oxide catalyst to form acrolein.

The acrolein is then converted into acrylonitrile in a second step by reaction with further oxygen and ammonia. The second step is also carried out in the presence of catalysts; cf. British Pat. No. 723,003. This process has the disadvantage that acrolein tends to polymerize and thus interferes with the reaction. Moreover, various by-products are formed in the reaction of acrolein with ammonia. Finally, this process is relatively expensive, since it is carried out in two steps.

U.S. Pat. No. 2,904,580 describes a one-step process for the conversion of propylene into acrylonitrile by reaction with oxygen (air) and ammonia in the presence of catalysts that contain bismuth, tin, or antimony compounds on the one hand and molybdenum, tungsten, and possibly also phosphorus compounds on the other. German Pat. No. 1,165,015 relates to a similar process, in which cobalt molybdate containing tellurium dioxide is used as the catalyst. In the process of German Pat. No. 1,243,175, supported catalysts consisting of a mixture of the oxides of iron, bismuth, molybdenum, and phosphorus are used in the ammonoxidation of propylene to acrylonitrile.

A catalyst suitable for the production of acrylonitrile by reaction of propylene with ammonia and oxygen or gases containing free oxygen should have the following characteristics:

high thermal stability,
a constant oxidation state during the reaction;
practically quantitative conversion of propylene with ammonia;
high selectivity for the formation of acrylonitrile;
a high ratio of acrylonitrile to other reaction products containing nitrogen, such as acetonitrile and hydrogen cyanide;
long life.

The known catalysts are not entirely satisfactory, since none of these possess all the desired characteristics. For example, the catalysts mentioned frequently have a low thermal stability, or difficulties arise in the preservation of a constant oxidation state of the catalyst during the formation of acrylonitrile. This has an adverse effect on the reaction and on the life of the catalyst. Finally, a number of known catalysts have poor selectivity with respect to propylene and ammonia.

The purpose of the invention is to provide a process for the production of acrylonitrile by means of a new catalyst in which the above-mentioned disadvantages are avoided. This purpose is achieved by the invention.

The object of the invention is thus a process for the production of acrylonitrile by reaction of propylene with ammonia and oxygen or gases containing free oxygen in the presence of metal oxide catalysts containing iron, bismuth, molybdenum, and possibly phosphorus, characterized in that a metal oxide catalyst that contains a mixture of the oxides of bismuth, zirconium, iron, molybdenum, vanadium, and possibly phosphorus in the atomic ratio $$Bi_{4-9} Zr_{1-4} Fe_{0.05-2} Mo_{12} V_{0.01-1} P_{0-2} O_{45-68}$$

is used.

A preferred phosphorus-free catalyst in accordance with the invention has the following composition of the active metals:

$$Bi_6 Zr_2 Fe_2 Mo_{12} V_{0.05} O_{52}.$$

Another preferred catalyst in accordance with the invention, which contains phosphorus, has the following composition:

$$Bi_6 Zr_2 Fe_1 Mo_{12} V_{0.05} P_1 O_{53}.$$

The elements mentioned are present as the oxides in every case.

The catalysts of the invention are preferably applied to a support. A preferred support is silicon dioxide or silica, because the silica improves the catalytic activity of the catalyst.

The invention also relates to a catalyst for use in the process of the invention, which has the above-mentioned composition and preferably contains silicon dioxide as a support. The silicon dioxide used as the support may be used in any form, for example as solid granulate or preferably in the form of a colloidal aqueous solution, which is mixed with the metal salt solutions to be used for preparing the catalyst composition of the invention.

The catalyst which contains silica as support for use in the process of the invention is preferably prepared by mixing an aqueous colloidal silica solution (silica sol) with aqueous solutions of thermally decomposable metal or ammonium salts of the individual active components of the catalyst, evaporation of the water, drying of the residue, and calcination of the resulting solid at high temperatures.

All metal or ammonium salts of the various components of the catalysts that can be decomposed by heating may be used. Preferred salts are bismuth nitrate, ferric nitrate, zirconium nitrate, ammonium molybdate, ammonium vanadate, and ammonium phosphate. Suitable aqueous colloidal silica solutions are solutions containing about 30% of silicon dioxide with a weight ratio of $Na_2O:SiO_2$ of 1:95, a pH of 9.65–10.15 at 25°C, and a f.p. of 0°C (Ludox HS, Du Pont). An aqueous colloidal silica solution having a silicon dioxide content of 30% with a weight ratio $Na_2O:SiO_2$ of 1:285 and a pH of 8.2 to 8.7 at 25°C (Ludox LS, Du Pont) may also be used.

To prepare a preferred catalyst, the aqueous solutions of the salts of the active catalyst components and the aqueous colloidal silica solution are mixed with one another in quantities such that the silicon dioxide content in the final catalyst is about 10 to 40 wt.%. The water is evaporated from the resulting mixture. The residue is dried by heating at temperatures up to about 130°C. The resulting solid is then slowly heated to temperatures of about 500° to 550°C in the presence of oxygen and kept at these temperatures for about 4 to 12 hours. In this calcination, the temperature is raised slowly, e.g. by about 50°C per hour. The temperature is preferably kept constant for about 1 to 4 hours in the region of about 280°C and also in the region of about 380°C.

The catalysts of the invention may be used in the fixed-bed process or preferably in the fluidized-bed process. In the latter case, the product obtained after calcination is ground. Particles having a particle size of about 50 to 100 μ are then separated by sieves.

Fluidized bed catalysts can also be prepared by spray-drying of the corresponding solutions. The conditions in this case are so chosen that at least 80% of the solid particles have a particle size of about 40 to 100 μ. The particles dried in this way are then subjected to heat treatment as described above.

The production of acrylonitrile by the process of the invention is preferably carried out at temperature of about 440° to 470°C and at normal (atmospheric) pressure. A gaseous stream of propylene, ammonia, and oxygen or gases containing free oxygen is introduced into the catalyst, which is maintained in a fluidized bed. The contact times are preferably about 2 to 6 seconds. A volume ratio of propylene to ammonia of 1:1 or approximately 1:1 is preferably maintained. When air is used as the oxidizing agent, the volume ratio propylene:ammonia:air is preferably about 1:1:12 to 1:1:12.5.

The catalysts of the invention are mainly characterized by their high thermal stability, their long life, and their constant oxidation state during the formation of acrylonitrile.

Under the above-mentioned reaction conditions, practically quantitative conversion of propylene and ammonia is achieved. The conversion is 99% or more. The selectivity for the formation of acrylonitrile is of the order of at least 80%.

The examples illustrate the invention.

EXAMPLE 1

6 moles of bismuth nitrate pentahydrate, 2 moles of zirconium nitrate pentahydrate, 2 moles of ferric nitrate hexahydrate, 1.71 mole of ammonium heptamolybdate, and 0.05 mole of ammonium metavanadate are dissolved in deionized water and added to an aqueous colloidal silica solution having a silicon dioxide content of about 30%, a weight ratio $Na_2O/SiO_2$ of 1:95, a pH of 9.65 to 10.15 at 25°C (Ludox HS, Du Pont). The quantity of colloidal silica solution is so chosen that the silicon dioxide content in the final catalyst is 40 wt.%. The resulting mixture is evaporated to dryness and the residue is dried by heating at 130°C. The temperature is then raised by 50°C per hour, with residence times of 2 hours at about 280°C and at about 380°C. When a temperature of about 530°C is reached, this temperature is maintained for 10 hours. The product is then allowed to cool. The resulting solid is ground. A fraction having a particle size of 50 to 100 μ is separated by sieving.

EXAMPLE 2

1 litre of the catalyst prepared in accordance with Example 1 is introduced into a steel tube with a diameter of 6.5 cm and a height of 1 m and with a porous partition of sintered steel at its lower end. The reaction vessel is also fitted with an electric resistance wound around the tube in the form of a spiral. A gas mixture with a volume ratio of propylene:ammonia:air of 1:1:12.5 is fed in at the lower end of the reaction vessel at a rate of 250 N litre/hour. The reaction is carried out at a temperature of 450°C without the use of increased pressures. A conversion of about 99% based on propylene and ammonia is obtained under these reaction conditions. On average, 80.5 moles of acrylonitrile, 5 moles of acetonitrile, and 3 moles of hydrogen cyanide are obtained per 100 moles of propylene introduced.

EXAMPLE 3

6 moles of bismuth nitrate pentahydrate, 6 moles of zirconium nitrate pentahydrate, 1 mole of ferric nitrate hexahydrate, 1.71 mole of ammonium heptamolybdate, 0.05 mole of ammonium metavanadate, and 1 mole of ammonium phosphate trihydrate are dissolved in deionized water, and an aqueous colloidal silica solution in accordance with Example 1 (LudoxHS) is then added. The quantity of silica solution is so chosen that the final catalyst contains 40 wt.% of silicon dioxide. The resulting mixture is treated further as described in Example 1.

EXAMPLE 4

1 litre of the catalyst prepared in accordance with Example 3 is introduced into the reaction vessel described in Example 2. The preparation of acrylonitrile is then carried out in accordance with Example 2. The conversion based on propylene and ammonia is about 99%. On average 79 moles of acrylonitrile, 6 moles of acetonitrile, and 2 moles of hydrogen cyanide are obtained per 100 moles of propylene.

What we claim is:

1. Process for the production of acrylonitrile by reaction of propylene with ammonia and oxygen or gases containing free oxygen in the presence of metal oxide catalysts containing iron, bismuth, molybdenum, and possibly phosphorus, characterized in that a metal oxide catalyst consisting of a mixture of the oxides of bismuth, zirconium, iron, molybdenum, vanadium, and possibly phosphorus in the atomic ratio $$Bi_{4-9}Zr_{1-4}Fe_{0.5-2}Mo_{12}V_{0.01-1}P_{0-2}O_{45-68}$$

is used, said elements being present solely as the oxides supported on silicon dioxide.

2. Process in accordance with claim 1, characterized in that a catalyst having the composition $$Bi_6 Zr_2 Fe_2 Mo_{12} V_{0.05} O_{52}$$

is used.

3. Process in accordance with claim 1, characterized in that a catalyst having the composition $$Bi_6 Zr_2 Fe_1 Mo_{12} V_{0.05} P_1 O_{53}$$

is used.

4. Process in accordance with claim 1, characterized in that the reaction is carried out at temperatures of about 440° to 470°C at normal pressure with a contact time of about 2 to 6 seconds and a propylene/ammonia ratio of about 1:1.

5. Process in accordance with claim 1, characterized in that a mixture of propylene, ammonia, and air in a volume ratio of about 1:1:12 to 1:1:12.5 is fed to the catalyst.

6. Process in accordance with claim 1, characterized in that a catalyst containing about 10 to 40 wt.% of silicon dioxide is used as a support.

* * * * *